L. P. L. BATTU.
STEAM REGENERATIVE ACCUMULATOR.
APPLICATION FILED SEPT. 27, 1911.
1,140,435.
Patented May 25, 1915.
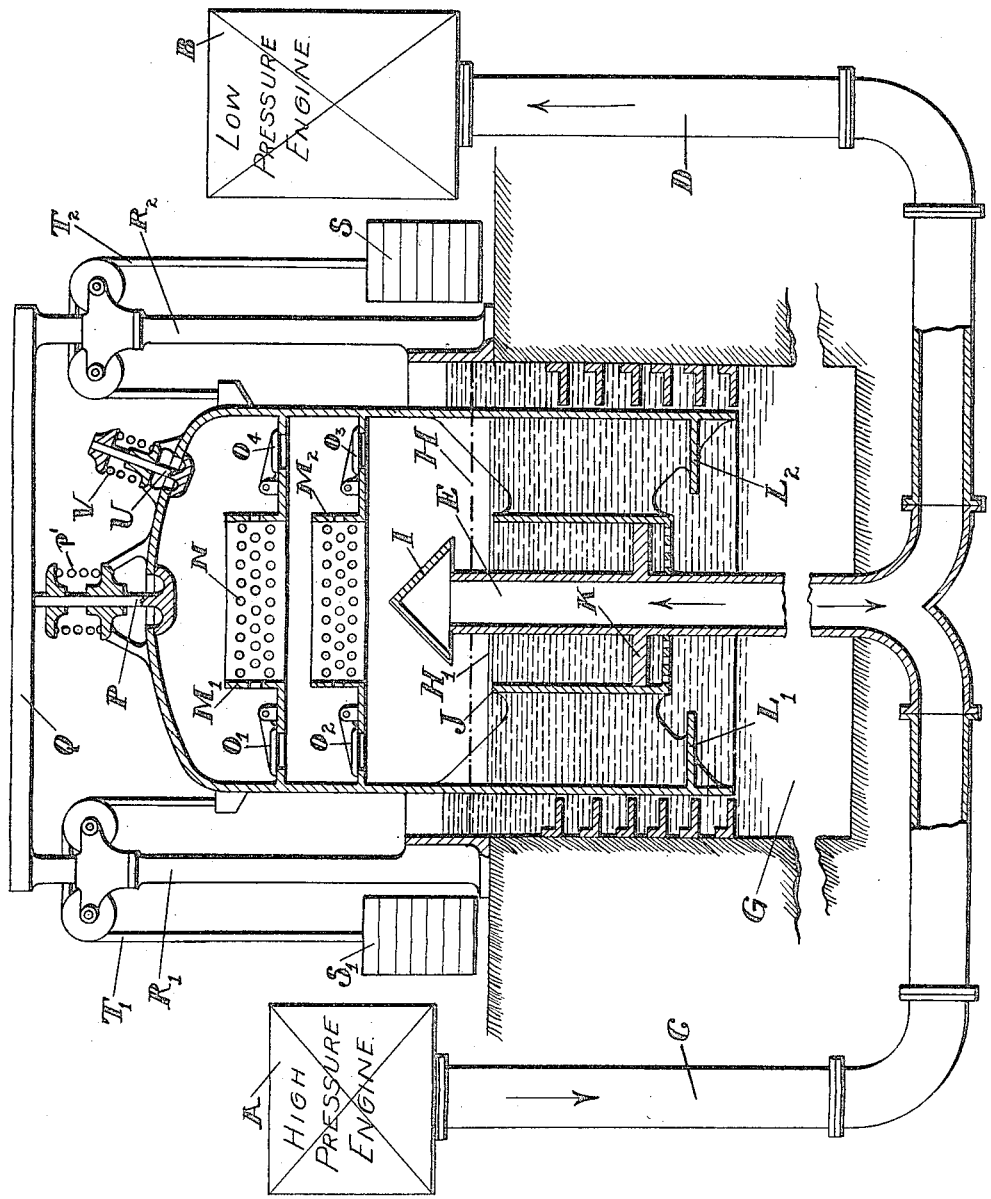
WITNESSES:
C. O. Brooks
C. H. Smoot
INVENTOR.
Leonce P. L. Battu

UNITED STATES PATENT OFFICE.

LEONCE P. L. BATTU, OF NEW YORK, N. Y., ASSIGNOR TO RATEAU STEAM REGENERATOR COMPANY, OF NEW YORK, N. Y.

STEAM-REGENERATIVE ACCUMULATOR.

1,140,435.  Specification of Letters Patent.  Patented May 25, 1915.

Application filed September 27, 1911. Serial No. 651,545.

*To all whom it may concern:*

Be it known that I, LEONCE P. L. BATTU, a citizen of the United States, residing in New York city, county and State of New York, have invented certain new and useful Improvements in Steam-Regenerative Accumulators, of which the following is a full, clear, concise, and exact description, reference being made to the accompanying drawing, forming a part of this specification.

My invention has for an object the regulation of a variable flux of steam and by means of it an intermittent flux of steam can be converted into a practically regular flux of steam.

My invention is especially well adapted to regulate the exhaust steam of intermittent high pressure engines for the purpose of driving continuous running low pressure engines. I interpose between the source of intermittent steam and the point where this intermittent steam is utilized a vessel having a volumetric and thermic storage capacity. The volumetric storage capacity for steam is due to the expansion of the vessel interposed between the source of intermittent steam and its point of use. The thermic storage capacity is due to the increase of temperature of water contained in the expanding vessel subsequent to increase of steam pressure in said vessel. It will be seen from the detailed description that the pressure within the vessel is obliged to rise and fall in a very special manner. The water contained within the vessel will be subjected to various steam pressures and will therefore be capable of absorbing and giving off heat.

I will explain my invention more fully by reference to the accompanying drawing, showing one application and embodiment of the invention, in which—

A is a high pressure engine whose flux of steam is to be regulated by my apparatus.

B is a low pressure engine which receives from my apparatus a continuous flux of steam.

C is a pipe line leading steam from high pressure engine A and communicates by means of pipe E with my regulating apparatus. It will be seen that pipe E is adapted to allow steam to flow to and from the regenerator. Steam also passes through pipes E and D on its way to the low pressure engine B, the pipe E being used for incoming and outgoing steam.

F is an inverted bell whose lower end is open and submerged in the well G, which is filled with water to the level H. As shown in the drawing, water level H has been displaced by pressure in the vessel to a lower position, $H^1$.

I is a conical cap placed over the top of pipe E, by means of which water is prevented from falling into pipe E.

J is a cylinder affixed to bell F.

K is a piston affixed to pipe E and moving within cylinder J, constituting a dashpot, which prevents violent up and down movements of the inverted bell F.

$L^1$ and $L^2$ are diaphragms affixed to inverted bell F, occupying a position always beneath the water level and by their motion cause a thorough mixing of the water within the well G.

$M^1$ and $M^2$ are annular trays affixed to the upper portion of bell F and are provided with a large number of small holes N.

$O^1$ and $O^2$ are flap valves placed on the bottom of the trays $M^1$ and $M^2$, which open to admit water freely to the trays, but close to prevent water flowing outward from the trays.

P is a valve located in the upper portion of bell F and is opened by a rising action of the bell F. Valve P begins to open when its upper portion is pressed sufficiently against the horizontal bar Q, which is affixed to the columns $R^1$ and $R^2$. Coil spring $P^1$ reacts against the pressure against the bar Q and has a closing action upon valve P.

$S^1$ and $S^2$ are counterweights, which exert a lifting action on bell F by means of cables $T^1$ and $T^2$.

U is a safety valve opening upward and held against the pressure of atmosphere by the adjustable compression spring V.

The operation of my apparatus is a follows: Steam enters the inverted bell F through piping C and E, raising the pressure within the bell F and lifting it out of the water. The trays $M^1$ and $M^2$ are submerged beneath the water level when the bell F occupies its lower position and the steam must have a sufficient pressure to elevate inverted bell F, together with the water contents of the trays $M^1$ and $M^2$, a further increase in pressure causing the inverted bell F to rise to higher and higher positions. The water contained in trays M¹ and M² pours outward and downward through the perforations N, constituting a large number of small streams of water passing through the steam contained within bell F and condensing large amounts of steam, absorbing the heat and raising the temperature of the water to the temperature of the steam within the bell F. When the steam stored within the bell F, due to displacement and due to the absorption by the water from the trays M¹ and M², has reached its maximum value, the bell F is at its greatest height and any additional steam entering will cause an opening of valve P, allowing the surplus steam to be discharged to atmosphere.

During the operation of absorption of steam by the bell F, the low pressure engine B is withdrawing steam through piping E and D, and the steam referred to above as being absorbed by displacement of bell F and by the heating of water contained by trays M¹ and M² is the excess of steam delivered by engine A over that required by engine B. A deficiency of steam for the operation of engine B will cause more steam to leave the bell F than enters and this steam will be supplied by the evaporation of water previously heated during a period of excess steam and also by the displacement of steam arising from the descent of bell F. The diaphragms L¹ and L² in moving up and down through the water give an active circulation to the water, which permits it to vary in temperature by the absorption and delivery of steam as the pressures change within the bell F. The dashpot J and piston K act to steady the vertical movements of inverted bell F and prevent too violent oscillations. The safety valve U is provided in order to avoid the possibility of the pressure within the bell F falling under an unsafe limit and the spring V is so adjusted that the pressure of atmosphere will open valve U when the difference in pressure between atmosphere and the pressure within the bell F has reached the maximum permissible value.

When the trays M¹ and M² are immersed in the water, the effort necessary to lift bell F is less than when the trays filled with water are above the level of the water contained in well or vessel G. In order that the pressure of the steam should lift these trays it is necessary that the pressure of the steam should increase. This rise in steam pressure creates a rise in temperature and gives to the regenerator, on account of the presence of the water, a thermic storage capacity. If the bell F was not equipped with trays and if its weight did not materially increase when the steam raises the bell out of the water, the pressure of the steam would have a marked tendency to remain practically constant and the action of the water falling in the steam would be practically *nil*, as once the water was at the temperature corresponding to the temperature of the steam it could not absorb any more heat and therefore could not condense the excess steam.

Having thus described my invention, I claim as new and desire to secure by Letters Patent:

1. A steam regenerator comprising a vessel containing liquid, an inverted bell having its open portion immersed in the liquid and means controlled by the displacement of the bell under the action of the steam pressure, adapted to raise with and inside the bell a portion of the liquid contained in the vessel.

2. A steam regenerator comprising a vessel containing liquid, an inverted bell having its open portion immersed in the liquid and means controlled by the displacement of the bell under the action of the steam pressure, adapted to raise with and inside the bell a portion of the liquid contained in the vessel and means allowing the portion of the liquid so raised to fall through the steam.

3. A steam regenerator comprising a vessel containing liquid, an inverted bell having its open portion immersed in the liquid and means controlled by the displacement of the bell under the action of the steam pressure, adapted to raise with and inside the bell a portion of the liquid contained in the vessel and means allowing the portion so raised to fall through the steam in divided streams.

4. In a steam regenerator a vessel having a varying capacity, a liquid contained in said vessel, means to direct the steam to be treated into said vessel, means responsive to the increase or decrease of steam pressure in the vessel controlling the capacity of said vessel, means to promote rapid heat interchanges between the liquid and the steam undergoing treatment and means to discharge steam from said vessel.

5. A steam regenerator comprising a vessel containing liquid, an inverted bell having its open portion immersed in the liquid and plates affixed to the bell under the liquid level adapted to promote circulation of the liquid contained in the vessel when said baffles rise and fall as the bell moves upward and downward.

6. In a steam regenerator a vessel of variable capacity containing a liquid, means to direct steam into said vessel, means to discharge steam from said vessel, and thermic and volumetric means combined adapted to store heat in said vessel when the steam pressure varies therein.

7. In a steam regenerator a vessel containing a liquid, means responsive to the pressure of the steam to be treated adapted to enlarge the capacity of said vessel and means to subject the steam undergoing treatment in said vessel to condensation by means of direct contact of the steam and of the liquid.

8. In a steam regenerator a vessel having a varying capacity, a liquid contained in said vessel, means responsive to the steam pressure adapted to increase the capacity of the vessel and means responsive to the steam pressure adapted to increase the surface of contact of the liquid and the steam contained in said vessel.

9. A steam regenerator comprising a vessel containing liquid, an inverted bell having its open portion immersed in the liquid, trays attached to the bell and valves located in said trays adapted to allow the liquid in which the bell floats to enter into the trays when the trays are plunged into the liquid.

In witness whereof, I have hereunto subscribed my name this 26th day of September, 1911.

LEONCE P. L. BATTU.

Witnesses:
C. H. SMOOT,
C. C. BROOKS.

Copies of this patent may be obtained for five cents each, by addressing the "Commissioner of Patents, Washington, D. C."